United States Patent [19]

Thalmann et al.

[11] Patent Number: 5,069,780
[45] Date of Patent: Dec. 3, 1991

[54] ULTRAFILTRATION DEVICE AND PROCESS

[75] Inventors: William H. Thalmann, East Amherst; Thomas W. Siegler, Kenmore, both of N.Y.

[73] Assignee: Infinitex, Clarence, N.Y.

[21] Appl. No.: 628,224

[22] Filed: Dec. 17, 1990

Related U.S. Application Data

[63] Continuation-in-part of Ser. No. 533,030, Jun. 4, 1990, Pat. No. 4,994,184.

[51] Int. Cl.⁵ .................... B01D 61/18; B01D 61/22
[52] U.S. Cl. .............................. 210/90; 210/195.2; 210/257.2; 210/321.65
[58] Field of Search ............... 210/251, 257.2, 321.64, 210/416.5, 195.2, 321.6, 321, 72, 79, 321.78, 321.64, 321.65, 321.8–321.89, 416.1, 90, 97

[56] References Cited

U.S. PATENT DOCUMENTS

4,444,597  4/1984  Gortz et al. .......................... 210/90
4,759,844  7/1988  Lipshultz et al. ................. 210/257.2

*Primary Examiner*—Frank Sever
*Attorney, Agent, or Firm*—Bean, Kauffman & Spencer

[57] ABSTRACT

A portable ultrafiltration device is disclosed comprising a prefilter, pump, membrane filter cartridges, temperature sensors, pressure sensors, process interdiction and control means placed to detect temperature and pressure variations of a feed mixture being processed by the device, and means cooperating with said temperature and pressure means to interdict the operation of the device to prevent damage to the components.

30 Claims, 3 Drawing Sheets

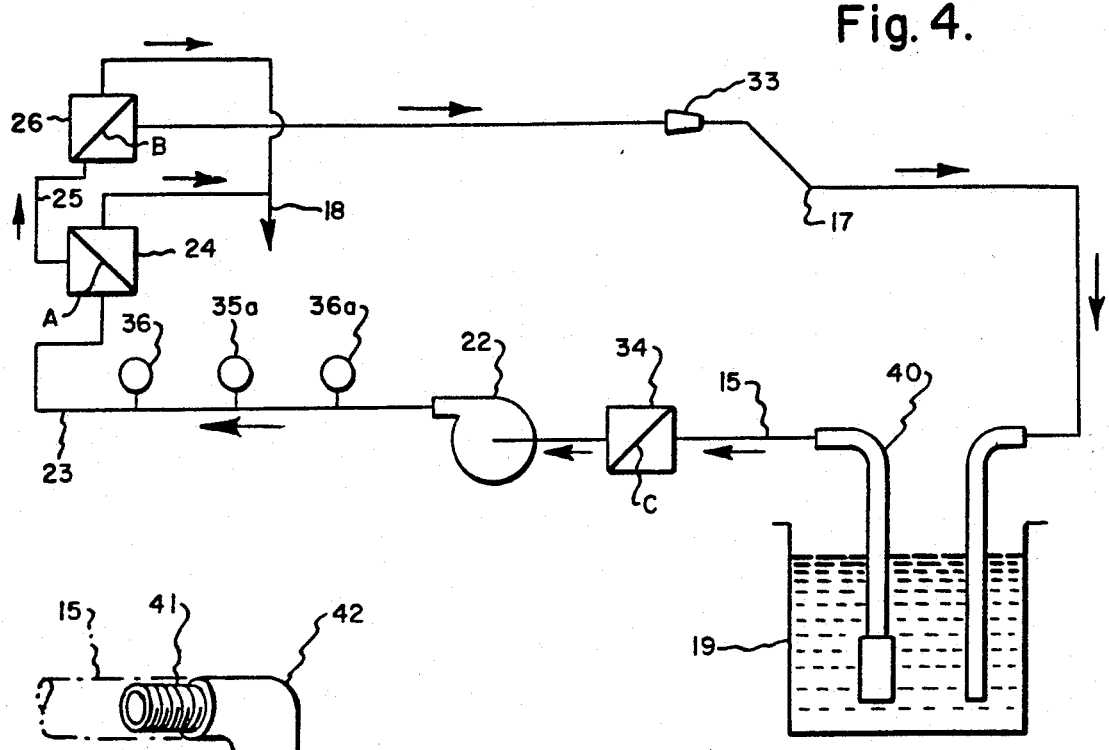
Fig. 4.
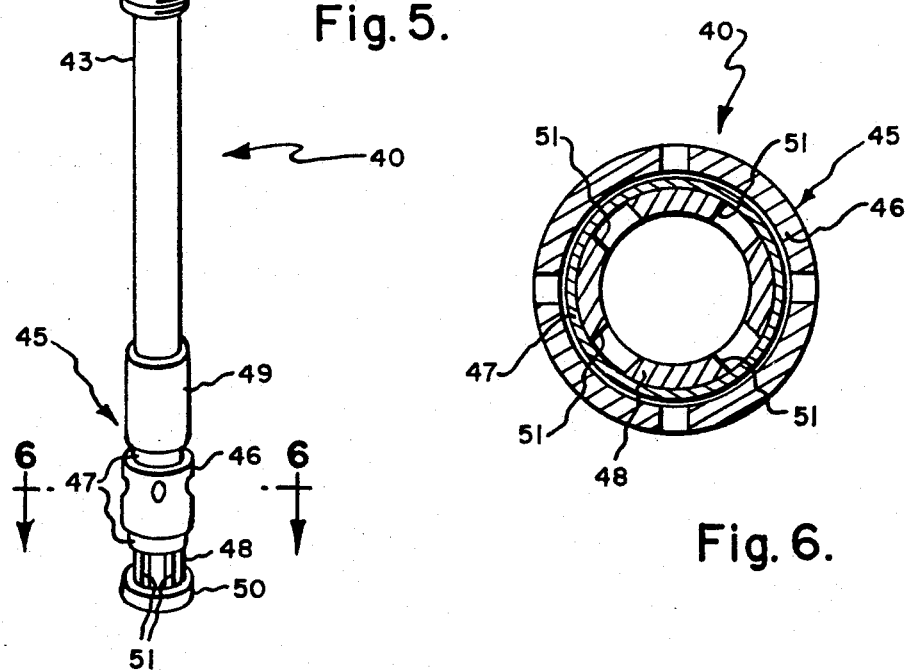
Fig. 5.
Fig. 6.

ULTRAFILTRATION DEVICE AND PROCESS

FIELD OF THE INVENTION

This application relates to an assembly for the separation of water from mixtures with larger molecule liquids such as oils, particularly to a new mobile ultra-filtration assembly comprising a novel fluid interdicting pick-up tube, prefilter, pump, and circular wound membrane elements arranged with temperature and pressure sensing means to provide automated operation of the device. This application is a continuation-in-part of U.S. patent application Ser. No. 07/533,030, filed June 4, 1990 now U.S. Pat. No. 4,994,184.

BACKGROUND OF THE INVENTION

In our industrialized society it is not unusual to find multiple diverse instances wherein larger molecule liquids have been mixed with water. For example, bilge water typically comprises a mixture of petroleum oil with water, as does typical liquid waste collections from automotive repair and wash facilities, machine shops, metal stamping plants, and typically any number of industrial or repair facilities wherein liquids such as oils and water are, or can be, commingled in use or collection.

With the increased awareness of society for the environment, there has been an increasing need for means to separate such larger molecule liquids and water mixtures so that clean water can be returned to the environment while the larger molecule liquids can be recovered and recycled for the further use and benefit of mankind. Federal, state and local governments, in response to this increased awareness of society, have promulgated and instituted new laws concerning the handling and disposal of such mixtures, particularly oil/water mixtures, such that it has become increasingly economically desirable to separate out as much water as possible from such mixtures conveniently at the site of commingling, to reduce the volume of liquid to be otherwise collected for recycle or disposal off site. Thus, there is an increasing need for a convenient, mobile device which will effectively and economically separate water from larger molecule liquids, particularly petroleum oils, to provide a reduced volume for collection, recycle and disposal at remote sites.

One device which has been proposed and is generally commercially available for the separation of such mixtures is the ultrafiltration device. In a typical ultrafiltration device a fluid containing mixture, such as oils with water is directed, under typically low pressure, to an ultra-filtration membrane. The ultra-filtration membrane comprises microscopic hydrophilic pores which will allow water to pass through the membrane but resist the passage of the oil molecules. Such selective activity is a function of the membrane, achieved through a combination of membrane characteristics including pore size, liquid contact angle and liquid surface tension. The membrane is typically arranged in a cross flow configuration wherein a feed from a water/oil mixture flows across the ultrafiltration membrane in such manner that the oil component of the mixture does not flow through the membrane but a portion of the water in the mixture will permeate the membrane at a low but acceptable pass-through rate. Thus, water flowing through the membrane comprises essentially no oil and can be recovered or wasted, in many instances without further treatment, while the treated mixture which does not permeate the membrane has an increased oil to water ratio. Typically the treated oil mixture, having an increased oil to water ratio, is returned to the feed mixture and is continually recycled in mixture with the feed mixture until the amount of water in the water/oil feed mixture has been significantly reduced.

Ultrafiltration devices of the type above described have typically been cumbersome units that require costly tending by the operator during the separation process to avoid harm to the membranes. Generally such prior art devices require extensive and complex disassembly procedures for routine cleaning and/or maintenance and as a result such units have not enjoyed a level of commercial success that might otherwise be expected. Such devices of the prior art also typically require about 24 hours or more to separate enough water from a 55 gallon container containing a typical 90:10 (water:oil) mixture to achieve a significantly concentrated typical 50:50 (water:oil) mixture while attaining an essentially oil free water waste containing less than about 50 ppm of oil.

It is an object of the instant invention to provide a mobile ultrafiltration device, capable of separating water from larger molecule liquids such as oils, to attain an essentially oil free water waste containing less than about 50 ppm of water, that is convenient to operate, is simplified in disassembly and internally protected from harm to costly membranes. These and other objects will become apparent from the following description of the invention.

SUMMARY OF THE INVENTION

The instant invention features a mobile ultrafiltration device comprising temperature and pressure sensing means, placed to detect temperature and pressure variations of a feed mixture being processed by the ultrafiltration device, and means cooperating with said temperature and pressure means to interdict the operation of the device to prevent damage to the components. The device generally comprises a prefilter, pump, membrane filter cartridges containing membrane elements, temperature sensor means, pressure sensor means, process interdiction and control means mounted to a wheeled support frame and having detachable feed input and oil return means. Provision is also made for an improved feed mixture pick-up tube comprising a sliding gate for interdicting liquid pick-up from an oil/water feed mixture.

BRIEF DESCRIPTION OF THE DRAWINGS

The nature and mode of operation of the present invention will now be more fully described in the following detailed description taken with the accompanying drawings wherein:

FIG. 4 is a flow diagram showing the fluid flow through a typical ultrafiltration assembly of the invention.

FIG. 5 is a perspective view of a pick-up tube comprising a sliding gate for interdicting fluid pick-up from an oil/water mixture holding container.

FIG. 6 is an enlarged sectional view of the sliding gate area of the pick-up tube of FIG. 7.

DESCRIPTION OF THE PREFERRED EMBODIMENT

It will be understood at the outset that the ultrafiltration device of the present invention possesses utility in diverse applications of ultrafiltration wherein water is to be separated from larger molecule liquids. However, in order to facilitate description of the present invention, specific reference will now be made to its use in association with removing water from a water/petroleum oil mixture contained in a standard 55 gallon or similar reservoir.

Figure 1:
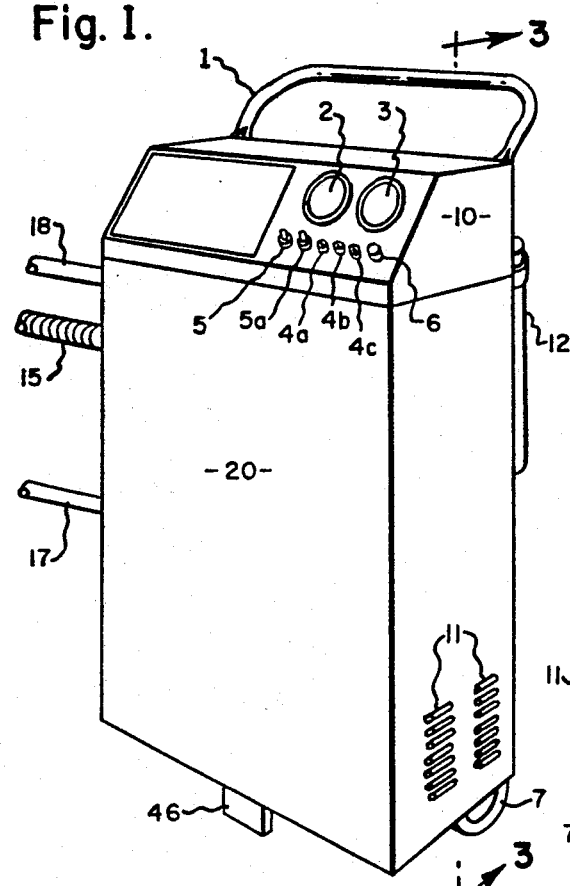
FIG. 1 is a front perspective view of a typical ultrafiltration unit of the invention.
Figure 2:
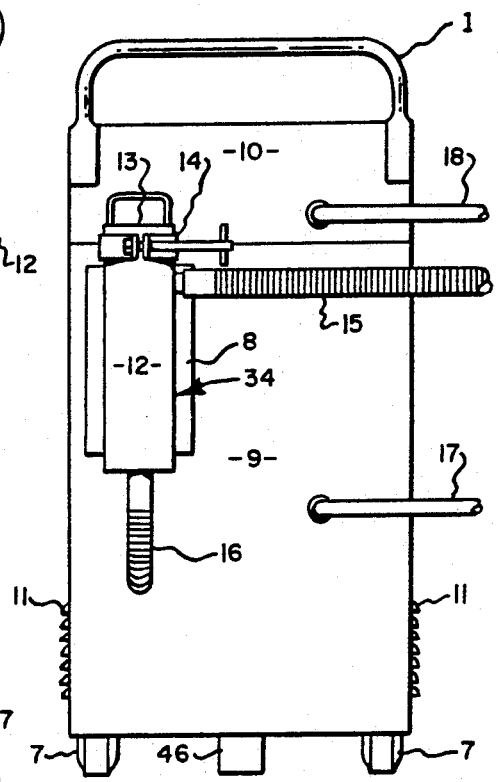
FIG. 2 is a rear plan view of the unit of FIG. 1.
Figure 3:
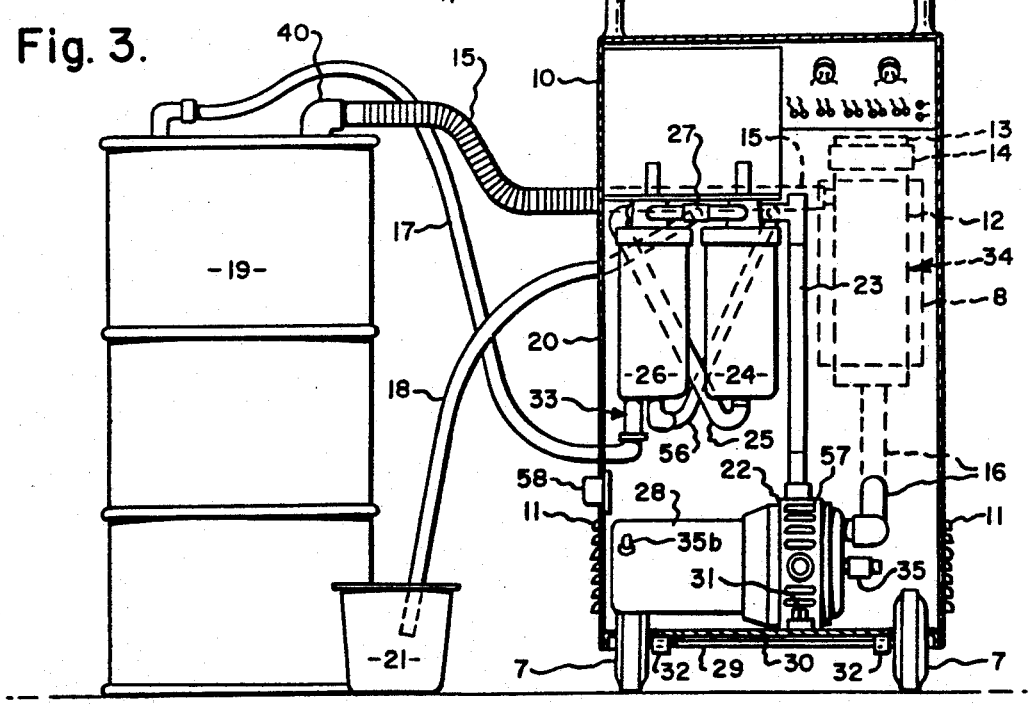
FIG. 3 is a front sectional view taken along about line 3—3 of the ultrafiltration unit of FIG. 1, showing major components of a typical assembly of the interior of the unit, set up in a typical arrangement for the ultrafiltration of an oil/water mixture contained in a holding container.

FIGS. 1, 2 and 3 illustrate an ultrafiltration assembly of the invention as generally including upper frame shroud 10, lower frame shroud 20 and base frame assembly 30, interconnecting to form the general supporting frame of the assembly. Upper frame shroud 10 generally acts in support of the instrumentation and controls of the unit and comprises handle 1 and an instrument control panel comprising temperature indicator 3, pressure indicator 2, indicator lights 4a, 4b and 4c, apparatus on/off switch 5, start/restart switch 5a, and fuse 6. Lower frame shroud 20 is typically louvered 11 to provide means to circulate cooling ambient air through the unit. Typically, circulating pump 22 comprises heat exchange fins 57 for passive exchange of heat to the air from the pump, and fan 58 is provided for forced circulation of ambient air through louvers 11 and about the interior of the apparatus. In circumstances where the ultrafiltration process, particularly the pumping process, generates significantly more heat than can be easily dissipated by fins 57 and/or fan 58, it is contemplated as within the invention to include heat exchange means elsewhere in the process stream. For example, a passive radiation heat exchange means may be incorporated in the feed mixture input, at or before the pre-filter assembly and may be interior or exterior to the assembly for dissipation to ambient air, or the system may contain refrigeration capability.

Base frame assembly 30 supports axle 29 and comprises axle mounts 32, wheels 7 and support leg 46. Circulating pump 22 is driven by motor means 28, is mounted to base frame assembly 30 by mount 31, and contains temperature sensing means 35.

FIG. 2 generally illustrates the rear of the assembly wherein rear access panel 9 is depicted as the support means for prefilter assembly 34, comprising prefilter canister mount 8, prefilter canister 12, having canister top 13 which is removably secured to the canister by compression collar means 14. The prefilter canister contains a prefilter (schematically shown in FIG. 4) with a prefilter support structure (not shown) and is typically included in the ultrafiltration assembly to filter out particulate matter from the feed mixture. Generally it has been found that a bag type, flow-through prefilter, sized to stop flow-through of particulate matter greater than about 20 microns and most preferably greater than about 100 microns, is adequate to prevent fouling of the ultrafiltration membrane, however, it should be understood that use of pre-filters having greater or lessor flow through size is contemplated as within the invention. Generally, a mesh basket provides an adequate support structure for the bag type prefilter however any convenient means, including a support structure integral with the prefilter is contemplated as within the invention.

Feed mixture reservoir input line 15, shown in section, connects to canister 12 to provide feed mixture input to the prefilter assembly, while feed mixture input line 16 carries the pre-filtered feed mixture to circulating pump 22 of the apparatus. Treated feed mixture return line 17 and waste water line 18 are shown in section and depict lines returning to feed mixture reservoir 19 and waste water receptacle 21 respectively.

FIG. 3 illustrates the general arrangement of components contained in the interior of the ultrafiltration assembly of FIG. 1 together with a typical feed mixture reservoir and waste water receptacle arrangement. Therein, pre-filtered feed mixture flows from prefilter canister 12 through feed mixture input line 16 into circulating pump 22 where it is passed through input line 23 to first membrane element containing ultrafiltration cartridge 24. Cross flow filtered feed mixture flowing from cartridge 24 is passed through connecting line 25 and through second membrane element containing ultrafiltration cartridge 26. By-pass line 56 diverts a portion of input feed mixture at a point before cartridge 24 and directly inputs feed mixture at a point after the filtration membrane of cartridge 26.

The flow arrangement of feed mixture illustrated in the drawings to ultrafiltration cartridges 24 and 26 is a preferred serial flow path wherein the feed mixture comprises a water and petroleum oil mixture and the two ultrafiltration membranes are contained in single chamber cartridges. It should be understood that it is contemplated as within the scope of the invention that the arrangement comprise one ultrafiltration cartridge and that the flow path alternately be a parallel flow path or a combination of serial and parallel flow paths wherein the assembly comprises three or more ultrafiltration cartridges or chambered units.

In the drawings, the treated mixture passes from the ultrafiltration cartridges through orifice 33, through treated feed mixture return line 17 to reservoir 19. Waste water removed during ultrafiltration is collected from cartridges 24 and 26, passes through waste water manifold 27 and is passed through waste water line 18 to waste water receptacle 21. It should be understood that typically the waste water can be directly sewered to waste, or in many instances can be reused. Referring now to FIG. 4, therein is schematically illustrated a preferred arrangement of components for fluid flow through an ultrafiltration unit of the invention, including placement of temperature and pressure sensors. Therein, circulating pump 22 moves a water/oil feed mixture from a reservoir 19, through pick-up tube 40 and feed mixture input line 15 to the prefilter assembly 34 where it is passed through a particulate barrier filter C to the circulating pump 22 and out.

Temperature sensing means monitor the temperature of the feed mixture at one or more points in the fluid flow to determine that fluid contacting the ultrafiltration membranes is not heated to a temperature wherein damage to the membrane can result. In the flow schematic of FIG. 4, temperature sensor 35a is preferably placed in the fluid flow between the prefilter and the ultrafiltration cartridge and temperature sensor 35 is placed within the circulating pump. Typically, in situations where the pump is directly interconnected to an electric motor drive as a unit structure, an appropriate thermal switch 35b, which acts to interrupt power to the motor in response to motor heat, can function as an indicator of feed mixture temperature and automatic cut-off of feed mixture flow to the membranes. Generally, a single temperature sensor can be placed to provide adequate monitoring of temperature variations.

Temperature sensors can be arranged in conjunction with a temperature indicator for visual observation and manual control of the unit, however, they are preferably arranged together with an automatic limit switching means for interdicting the flow of fluid through an ultrafiltration cartridge, generally by interrupting power to the circulating pump, upon sensing of a temperature outside the limiting range. In the preferred embodiment of the drawings, a temperature sensor 35 is located at the pump which is coupled with visual temperature indicator 3 provided on the control panel of the upper frame shroud 10. A second temperature sensor 35a is located at ultrafiltration cartridge 24 and also comprises an automatic limit switching means which interrupts power to the circulating pump 22 upon sensing a temperature outside a preset range. In the illustrated invention, indicator light 4c at the control panel of the upper frame shroud turns on when the circulating pump has been interdicted by exceeding temperature limits. It should be understood that contemplated as within the scope of the invention is placement of such temperature sensing means and/or automatic limit switching means elsewhere in the ultrafiltration unit, as for example temperature sensor 35b can be located in the electric motor of the pump and will interrupt operation of the motor upon exceed a preset temperature, or, placing temperature sensing means at a point in the fluid stream at or beyond the ultrafiltration cartridges and adjusting interdiction to occur at adjusted temperatures. Though it has been found convenient in the embodiment of the invention illustrated in the figures to manually restart the system, after interdiction, by manual restart switch 5a, it is also contemplated as within the invention to include automatic switching means that reconnects current to the circulating pump upon sensing a return of the temperature of the feed mixture to the desired temperature range or after a preset time interval.

In general, temperature interdiction limits depend upon the physical limits of the ultrafiltration membrane element. The ultrafiltration assemblies of the instant invention comprise spiral wound ultrafiltration membranes sandwiched to form chambers with glued separators therebetween which form the membrane element. Typically it has been found that feed mixture temperatures which are less than about 32° Fahrenheit create processing difficulties because of significantly increased viscosity of the feed mixture. Temperatures exceeding about 200° Fahrenheit generally create processing difficulties by weakening the ultrafiltration membranes which can significantly reduce the efficiency of the ultrafiltration process. Though both low and high temperature limit switching is contemplated as within the invention, generally low temperature switching is obviated by simple observation of the operator and is not typically a desired component of the invention. Typically temperature sensors which are suitable for use in the invention in interrupting the power to a circulating pump are those having an upper temperature limitation above about 150° degrees Fahrenheit, while those having a temperature limitation above about 120° degrees Fahrenheit are preferred.

Pressure sensing means 36 are placed to monitor the pressure of the feed mixture at one or more points in the fluid flow so that fluid contacting an ultrafiltration membrane is within an efficient ultrafiltration pressure range and wherein damage to the membrane and/or circulating pump can be avoided. At least one pressure sensor is preferably placed in the fluid flow at a point from the circulating pump to outlet orifice 33. A most preferred placement is between the circulating pump and a final ultrafiltration membrane. Pressure sensors can be arranged in conjunction with a pressure indicator for visual observation and manual control of the unit, however, they are preferably arranged together with an automatic limit switching means to interdict the flow of fluid through an ultrafiltration membrane. Generally interdiction is achieved by interrupting the power operating the circulating pump, upon sensing of a pressure outside the limiting range. Most preferably the pressure sensing means comprises a high and/or low pressure sensing switch that automatically turns off the circulating pump upon exceeding preset pressure limits. The device control panel will indicate interruption of the circulating pump at indicator light 4a so that the operator is aware of the status of control. In the preferred embodiment of the drawings, ultrafiltration cartridges 24 and 26 can comprise a pressure sensor 36 on the feed mixture side of the membranes. Pressure sensor 36a provides input to pressure indicator 2 for visual observation of pressure, while pressure sensor 36 comprises an automatic limit switching means which interrupts power to the circulating pump 22 upon sensing a pressure outside a preset range. In the illustrated invention, indicator light 4a at the control panel of the upper frame shroud turns on when the circulating pump has been interdicted by exceeding pressure limits.

Though it has been found convenient in the embodiment of the invention illustrated in the figures to manually restart the system, after interdiction, by manual restart switch 5a, it is also contemplated as within the invention to include automatic switching means that reconnects current to the circulating pump and can restart the circulating pump when the desired pressure ranges are again attained.

In general, pressure interdiction limits depend upon the physical limits of the ultrafiltration membrane as well as the fittings and materials of construction of the assembly. Typically it has been found that the membrane of the invention can handle pressures well in excess of 200 psi.

Returning now to FIG. 4, feed mixture is pumped out of the circulating pump, under pressure, and flows by means of input line 23 to the first ultrafiltration cartridge 24. Therein it contacts, under pressure in crossflow, membrane A and water contained in the mixture crosses the ultrafiltration membrane for wasting through waste water line 18. The feed mixture, still under pressure from the action of the circulating pump, exits the first ultrafiltration cartridge 24 through connecting line 25 and is transported to the second ultrafiltration cartridge 26. Still under pressure, the feed mixture contacts ultrafiltration membrane B wherein water contained in the mixture crosses the membrane for wasting through waste water line 18. The treated feed mixture flows through pressure control orifice 33 and is circulated back to the feed mixture reservoir. Though not shown in the flow scheme of FIG. 4, a portion of the feed mixture input is typically diverted from input line 23 to the circulating feed mixture of ultrafiltration cartridge 26.

The pressure control orifice acts in conjunction with the circulating pump and typically the diverted feed mixture stream, to maintain an appropriate feed mixture stream pressure against the ultrafiltration membrane and maintain a minimal change in fluid pressure ($\Delta p$) across the ultrafiltration membranes. Thus, the selection of the size of the orifice is dependent upon the operating characteristics of the pump and the characteristics of the fluid transmission system from the circulating pump to the orifice. Generally, it is preferred that the characteristics of the pump and the system be such as to produce an output head sufficient, when restricted by the orifice, to provide from about 45 to about 100 lbs/in$^2$ pressure at the ultrafiltration membrane and having a $\Delta p$ less than about 4 lbs/in$^2$ and preferably less than about 3 lbs/in$^2$. We have found it preferable that the pressure be maintained at from about 50 to about 75 lbs/in$^2$ pressure and most preferable when the pressure is from about 55 to about 65 lbs/in$^2$. Operating the assembly under such conditions has acted to reduce the water content of a 90:1 water oil mixture contained in a 55 gallon container to a 50:50 mixture in less than eight hours in experimental tests.

Figures 7, 8, 9:
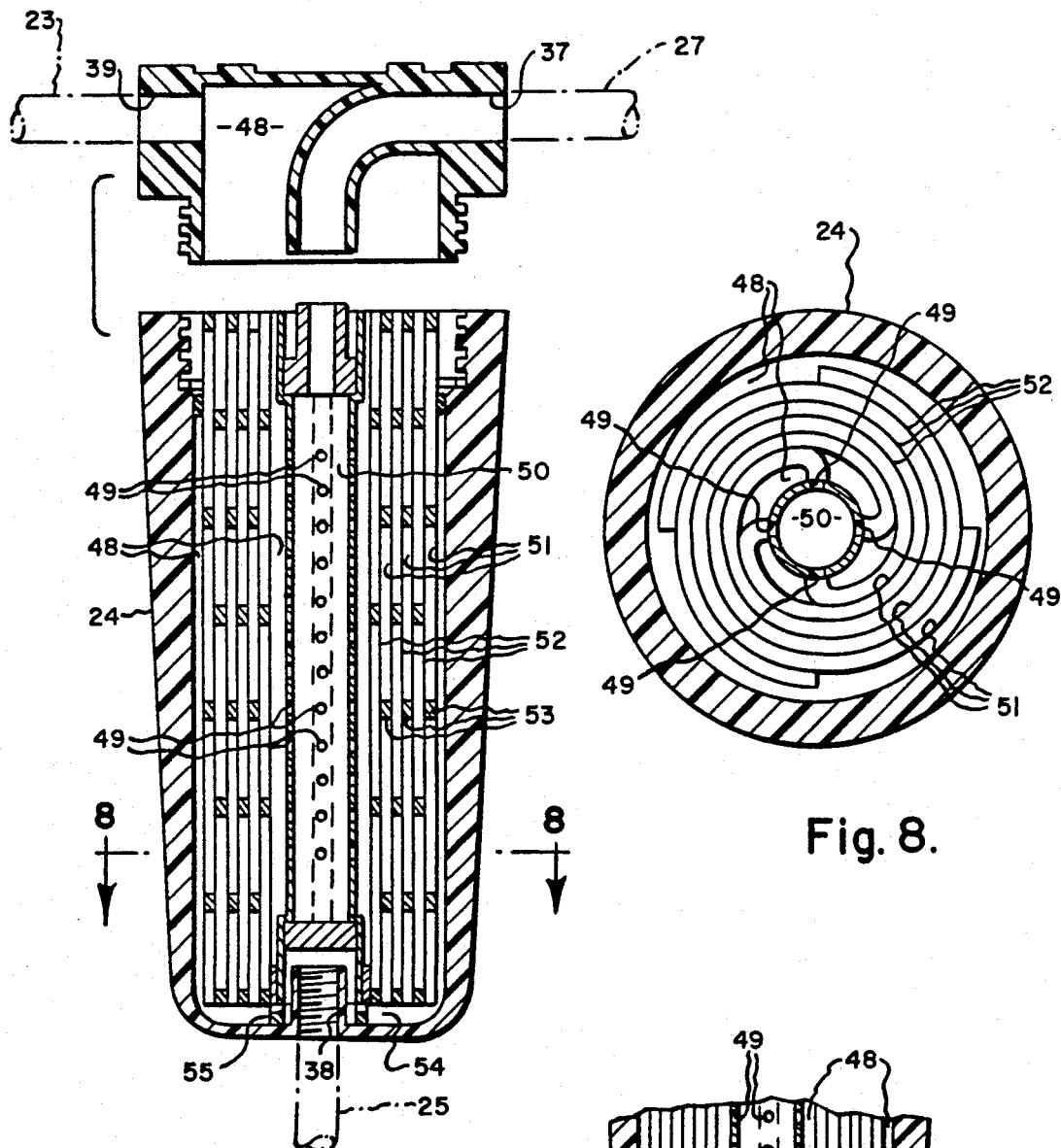
FIG. 7 is an enlarged fragmentary sectional view of a cartridge assembly of FIG. 3 containing a ultrafiltration membrane element.
FIG. 8 is a top sectional view taken along about line 8—8 of FIG. 7.
FIG. 9 is an enlarged fragmentary sectional view of a cartridge assembly of FIG. 3 taken in the area designated FIG. 9.

FIGS. 7 and 8 illustrate a typical ultrafiltration membrane cartridge containing a membrane element operable with the invention. Therein is shown a typical first ultrafiltration cartridge 24 wherein feed mixture is transported through feed mixture input line 23 to cartridge feed mixture inlet 39. Therein it flows from collection chamber 48 through passages 51 between sandwiched, spiral wound, ultrafiltration membranes 52, the sandwiched membranes being held apart by separators 53. Feed mixture flowing from between the sandwiched membranes is collected at cartridge lower area 54 and flows through spacer 55, through feed mixture outlet 38 into connecting line 25. Water diffusing through ultrafiltration membranes 52 collects within the sandwiched membranes, flows through openings 49 to central chamber 50 and out cartridge waste water outlet 37 to waste manifold 27.

FIG. 9, illustrates the configuration of the lower area of cartridge 26 in FIG. 3, wherein by-pass line 56 inputs diverted feed mixture to the base of the cartridge at outlet 38 and treated feed mixture leaves the cartridge from outlet 57 through orifice 33 and treated feed mixture return line 17.

Ultrafiltration membrane elements especially useful in the assemblies of the invention comprise spiral wound configured, cartridge type membrane elements which resist flow therethrough of molecules having a molecular weight greater than water. Typically such membranes are thin film membranes and have an operating pH range of about 2-11, an operating pressure range of from about 40-400 psi and an operating temperature range up to about 150° Fahrenheit. Polysulfone base membranes have been found to be particularly suitable for the ultrafiltration assembly of the invention, particularly membrane cartridges containing elements comprising a gross contact area of from about 6 to about 18 ft$^2$ and most preferably about 9 ft$^2$.

FIGS. 5 and 6 illustrate a pick-up tube which is suitable for use with the ultrafiltration assembly of the invention, particularly when the feed mixture reservoir comprises a 55 gallon drum. Therein is shown a pick-up tube 40 comprising hollow feed mixture line attachment fitting 41, hollow elbow 42, hollow upper tube 43, drum fitting 44 and fluid pick-up control assembly 45. Fluid pick-up control assembly 45 comprises hollow gate 46 which is vertically slidably movable over hollow lower tube 48 from upper stop 49 to lower stop 50. Disposed between hollow lower tube 48 and hollow gate 46 is bearing sleeve 47 which provides a self lubricating surface, preferably "Teflon", for slidable movement of hollow gate 46. It should be understood that bearing sleeve 47 may also comprise the surface of hollow lower tube 48 and need not be a separate component. Lower stop 50 further caps the end of hollow lower tube 48 restricting fluid flow therethrough. The lower portion of hollow lower tube 48 comprises inlet voids 51 that, when hollow gate 46 is in the upward position, allow fluid flow from the reservoir into the pick-up tube and when lower tube 48 is in the lower position are restricted from allowing fluid flow into the pick-up tube.

Hollow gate 46 is manufactured from a material having a density less than that of the feed mixture which is to be ultra-filtered, such that when the pick-up tube is placed in the reservoir to a liquid level higher than the fluid pick-up control assembly the sliding gate will "float" upward toward the upper stop and allow fluid to flow from the reservoir, through inlet voids 51, into the pick-up tube to be lifted out by the suction of the circulating pump. As the level of the liquid in the reservoir is reduced, the sliding gate will "float" downward until inlet voids 51 are covered and the flow is restricted, thus interdicting fluid pick-up from the oil/water mixture holding container. Generally it has been found that a sliding gate manufactured from polypropylene or polyethylene is of suitable density to "float" in accord with the aforesaid.

As fluid pick-up from the reservoir is interdicted, a differential in fluid pressure in the ultrafiltration device will be detected by the pressure sensors. Upon reaching a pressure differential beyond the system limits, the ultrafiltration device automatically turns off current to the circulating pump and shuts down the device. Thus the fluid pick-up assembly in combination with the ultrafiltration assembly acts automatically in shutting down when the feed mixture reservoir reaches a lowered level.

It should be understood that various modifications of the illustrated assembly are evident therefrom which can be seen as providing equivalent functions in the assembly, each of which are contemplated as within the scope of this invention.

We claim:

1. A portable ultrafiltration assembly comprising: a prefilter sufficient to filter particles, having a size greater than about 100 microns, from an influent liquid feed stream comprising greater than about 50 percent by weight water; pump means, sufficient to pump an influent liquid feed from a reservoir source into said assembly through said prefilter; temperature sensor means, sufficient to detect temperature variations of said liquid feed being processed in said assembly; pressure sensor means, sufficient to detect pressure variation of said liquid feed being processed in said assembly; means for dissipating heat generated during processing from said assembly; means cooperating with a temperature sensor to interdict the operation of said pump means; means to transport liquid feed from said pump means to a membrane filter assembly; membrane filter assembly comprising an influent feed treatment zone containing a liquid feed inlet and outlet, and a water receiving zone containing a water outlet, said zones being separated by a hydrophilic ultrafiltration membrane through which water can pass from said influent feed treatment zone to said water receiving zone; means cooperating with a pressure sensor to interdict the operation of the pump means; and, orifice means cooperating with said pump means sufficient to maintain a liquid feed pressure of from about 45 to about 100 lbs/in$^2$ at said membrane and a $\Delta p$, along said membrane, of less than about 4 lbs/in$^2$.

2. The assembly of claim 1 wherein said influent liquid feed comprises water and a liquid having a molecular weight greater than water.

3. The assembly of claim 1 wherein said influent liquid feed comprises oil and water, and wherein said oil has a greater molecular weight than said water.

4. The assembly of claim 3 wherein said influent liquid feed comprises petroleum oil and water.

5. The assembly of claim 1 wherein said prefilter means comprises a canister containing a flow-through filter bag.

6. The assembly of claim 1 comprising a temperature sensor mounted to detect temperature variation of said liquid feed at said pump means.

7. The assembly of claim 6 comprising visual temperature indicator means.

8. The assembly of claim 1 comprising means, cooperating with a temperature sensor mounted to detect temperature variation of said liquid feed, to interdict the operation of said pump means.

9. The assembly of claim 1 comprising visual temperature indicator means.

10. The assembly of claim 1 comprising a pressure sensor mounted to detect pressure variation of said liquid feed at said membrane filter assembly.

11. The assembly of claim 10 comprising visual pressure indicator means.

12. The assembly of claim 1 comprising means, cooperating with a pressure sensor mounted to detect pressure variation of said liquid feed at said membrane filter assembly, to interdict the operation of said pump means.

13. The assembly of claim 1 comprising visual pressure indicator means.

14. The assembly of claim 1 comprising means for overriding interdiction of said pump means.

15. The assembly of claim 1 comprising a support frame.

16. The assembly of claim 15 wherein said support frame is mounted to wheels.

17. The assembly of claim 1 wherein the size of the orifice is variable.

18. The assembly of claim 1 comprising multiple membrane filter assemblies.

19. The assembly of claim comprising two membrane filter assemblies.

20. The assembly of claim 19 wherein said membrane filter assemblies are arranged in serial flow communication.

21. The assembly of claim 1 comprising a polysulfone membrane.

22. The assembly of claim 1 comprising an ultrafiltration membrane operable at a pH from about 2 to about 11, a temperature of below about 120° Fahrenheit and a pressure of from about 40 to about 200 psi.

23. The assembly of claim 1 wherein a membrane filter assembly comprises at least two, juxtaposed, liquid feed inlets.

24. The assembly of claim 1 comprising a spiral wound ultrafiltration membrane cartridge having a gross contact area of from about 6 to about 18 ft$^2$.

25. The assembly of claim 1 wherein said means for dissipating heat generated during processing comprises heat exchange fins arranged on said pump means.

26. The assembly of claim 1 wherein said means for dissipating heat generated during processing comprises a fan arranged to direct air through said assembly.

27. The assembly of claim 1 wherein said temperature sensor is arranged at an electric powered motor driving said pump means.

28. The assembly of claim 27 wherein said temperature comprises a thermal switch.

29. The assembly of claim 1 comprising heat energy exchange fins arranged on said pump means and a thermal activated switch arranged at an electric powered motor driving said pump means.

30. An ultrafiltration assembly for removing water from a liquid feed comprising water and a fluid having a greater molecular weight than water, comprising:
pump means, sufficient to pump liquid feed from a reservoir source through said assembly;
temperature sensing means, sufficient to detect a temperature variation of said liquid feed being processed in said assembly;
pressure sensing means, sufficient to detect a pressure variation of said liquid feed being processed in said assembly;
means for dissipating heat generated during processing from said assembly;
means cooperating with said temperature sensing means, to interdict the operation of said pump means;
ultrafiltration means comprising a liquid feed treatment zone and a water receiving zone, said liquid feed treatment zone comprising a liquid feed inlet and a liquid feed outlet, said water receiving zone comprising a water outlet;
said treatment zone and said receiving zone being separated by a hydrophilic ultrafiltration membrane through which water can pass from said liquid feed treatment zone to said water receiving zone;
means cooperating with said pressure sensing means to interdict the operation of said pump means; and
orifice means, cooperating with said pump means sufficient to create a back-pressure in said ultrafiltration means.

* * * * *

UNITED STATES PATENT AND TRADEMARK OFFICE
CERTIFICATE OF CORRECTION

PATENT NO. : 5,069,780

DATED : December 3, 1991

INVENTOR(S) : W.H. Thalmann et al

It is certified that error appears in the above-identified patent and that said Letters Patent is hereby corrected as shown below:

Col. 7, line 13 - "across" should be ---along---.

Col. 9, line 61 - change "claim" to read ---claim 1---.

Col. 10, lines 25-26 - after "temperature", insert ---sensor---.

Signed and Sealed this

Twentieth Day of April, 1993

Attest:

MICHAEL K. KIRK

*Attesting Officer*     Acting Commissioner of Patents and Trademarks